Sept. 15, 1959     R. M. SHEPARD     2,904,376
EXPANDER STRUCTURE
Filed May 3, 1956
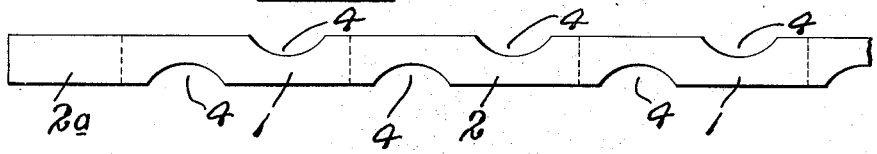
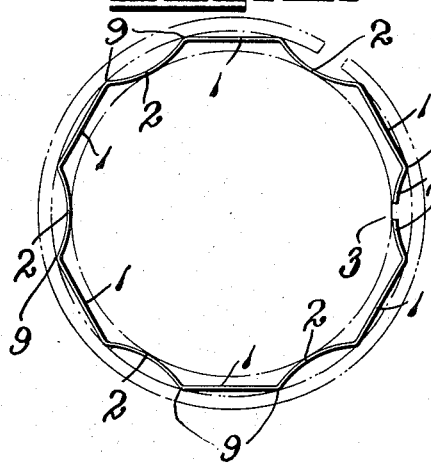 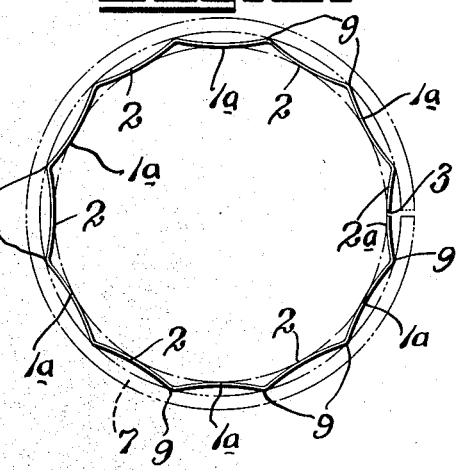
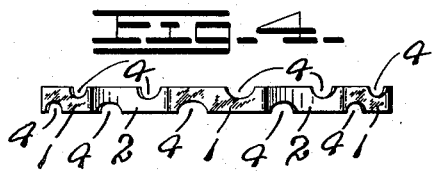 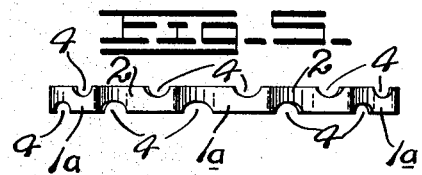
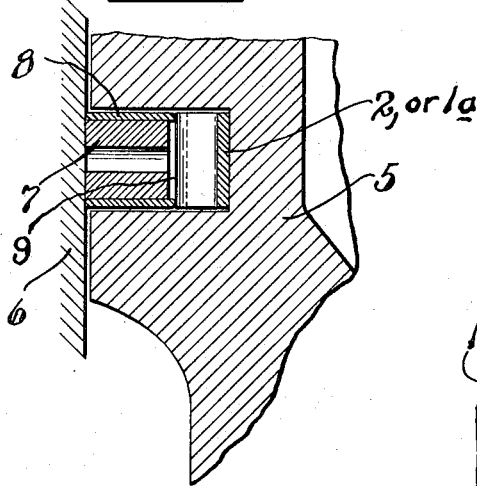 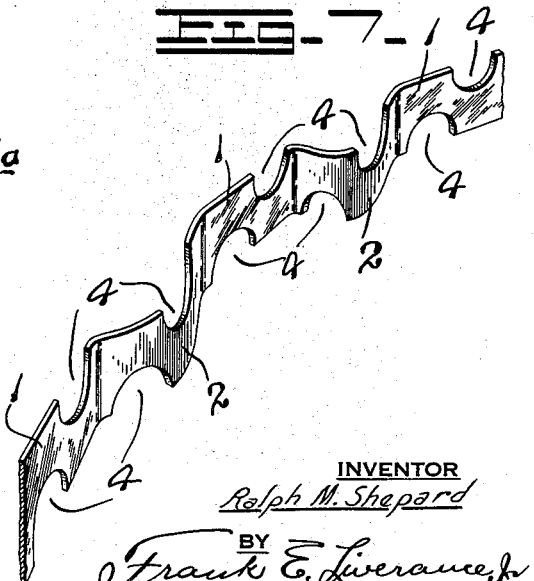
INVENTOR
*Ralph M. Shepard*
BY *Frank E. Liverance, Jr.*
ATTORNEY

2,904,376
EXPANDER STRUCTURE

Ralph M. Shepard, Muskegon, Mich., assignor to Muskegon Piston Ring Company, Muskegon, Mich., a corporation of Michigan Application May 3, 1956, Serial No. 582,451

2 Claims. (Cl. 309—40)

The present invention is in connection with a practical and economically manufactured piston ring expander which provides greatly increased support for the piston ring used therewith, in fact doubles the regular number of points of pressure engagement of the expander with the piston ring without increase in cost. Such increased or double number of pressure and support points for a piston ring also results in improved centering or stabilizing of a piston the rings of which are supplied with the expander of my invention. The present invention provides an expander having such double number of pressure and support points, to obtain which in the expanders with respect to which the present invention is an improvement would require twice as many strokes of a punch press as required with the novel expander of my invention.

An understanding of the invention may be had from the following description taken in connection with the accompanying drawing, in which, Fig. 1 is a fragmentary plan view of a length of thin ribbon metallic stock from which the expander is made and illustrative of the manner in which the expander is formed in a punch press.

Fig. 2 is a plan view of the expander in accordance with my invention.

Fig. 3 is a similar plan view showing the expander in the form it takes when acted upon by a surrounding closed piston ring, the expander bottoming at spaced intervals upon the bottom of a piston ring groove, and the surrounding ring closed at its parting being pressed against it, the larger number of pressure and supporting points being shown.

Fig. 4 is an elevation of the expander in its free normal state as in Fig. 2.

Fig. 5 is a similar elevation of the expander in the state which it takes when in use as in Fig. 3.

Fig. 6 is a fragmentary vertical section illustrative of a piston within a surrounding cylinder and showing the expander of my invention assembled with a piston ring, and Fig. 7 is a fragmentary perspective view of the expander in its free state, as in Fig. 2.

The expander of a thin spring ribbon metallic stock and having a width such that it is received within a piston ring groove of a piston is formed, as shown in Fig. 2, with alternate straight sections 1 and inwardly bowed or curved sections 2. The length of the sections 1 and 2 are substantially the same. Such expander in a generally circular form has its ends separated in a parting 3 as usual. The end portions 2a of the expander are inwardly bowed, the two end portions providing together an inwardly bowed section divided or parted at its middle, as shown.

The expander when used with oil rings will be provided with venting openings or recesses, one type of which is indicated at 4. The expander may be vented for oil passage in numerous other ways.

Such an expander is adapted to be located in a piston ring groove of a piston 5. Such piston within a cylinder, a fragmentary portion of a wall of which is shown at 6, presses outwardly against a piston ring located in the outer portion of the ring groove. As shown in Fig. 5, the piston ring includes a spacer 7 and upper and lower thin metallic rails 8, such spacer and rails being parted at one side to pass over the piston in the same manner that the expander is parted at one side at 3 for such purpose. The particular type of piston ring used is not a matter of concern in the present invention. It can be used with an oil ring, with a single piece compression ring and at any place where expanders are now used in association with piston rings in an internal combustion engine, pump or other places where sealing rings are used with pistons which reciprocate in cylinders.

The inwardly curved sections 2 are formed one after the other as the strip is fed underneath the punch of the punch press, each section 1, one at each end of each section 2, being substantially covered one-half by the punch so that each punch operation acts upon and forms a section 2 and adjacent portions of the section 1. Thus the punch press operations upon the strip to provide an expander as shown in Fig. 2 will be six in number.

When the expander is placed within the ring groove of a piston the middle portions of the inwardly bowed sections 2 come against the bottom of the piston ring groove. On contracting the piston ring at its parting upon an installation of a piston equipped with piston rings in a cylinder, the straight sections 1 will be inwardly curved as shown at 1a in Fig. 3 to also seat at their middle portions against the bottom of the ring groove.

It will be noted that the points of contact at 9 are twelve in number or double the number of the punch press operations required in producing the expander. This doubles the ordinary number of contact and pressure points over what, with the normally constructed expanders, would be furnished with the same number of strokes of the punch press in forming the expander. These more numerous and consequently closer spaced pressure points result in a more uniform loading of the expander against the piston ring and, thus, a more uniform pressure around the ring against the cylinder wall. In addition, the increased number of pressure points against the bottom of the piston groove aids in stabilizing the piston in the cylinder bore. Thus, the expander better accomplishes its desired functions and, in addition, is more economical to produce.

The expander is also adapted if a wedging, sealing action of rails in a spacer rail separated piston ring is desired to accomplish such purpose in the old manner, which consists in inwardly inclining edge portions of the expander at both its upper and lower edges where it bears against the rails. This is not shown in the present disclosure as it is old and well known.

The invention is defined in the appended claims and is to be considered comprehensive of all forms of structure coming within their scope.

I claim:

1. A piston ring expander of generally circular form parted at one side, made from thin, metallic, spring ribbon material, having alternate successive straight and inwardly bowed sections of substantially equal lengths, and an outwardly extending contact point at the juncture between each bowed and straight section.

2. A resilient parted expander of generally circular form having alternate straight and inwardly arched sections; an outwardly projecting geniculate point at the juncture between each of said straight and arched sections; the length of material in each of said straight sections being the same as the length of material in said arched sections.

References Cited in the file of this patent

UNITED STATES PATENTS

| | | |
|---|---|---|
| 1,773,250 | Amberg | Aug. 19, 1930 |
| 1,869,108 | Marien | July 26, 1932 |
| 2,113,857 | Phillips | Apr. 12, 1938 |
| 2,460,430 | Phillips | Feb. 1, 1949 |
| 2,562,675 | Mayfield | July 31, 1951 |

FOREIGN PATENTS

| | | |
|---|---|---|
| 907,007 | Germany | Mar. 18, 1954 |